Patented May 29, 1945

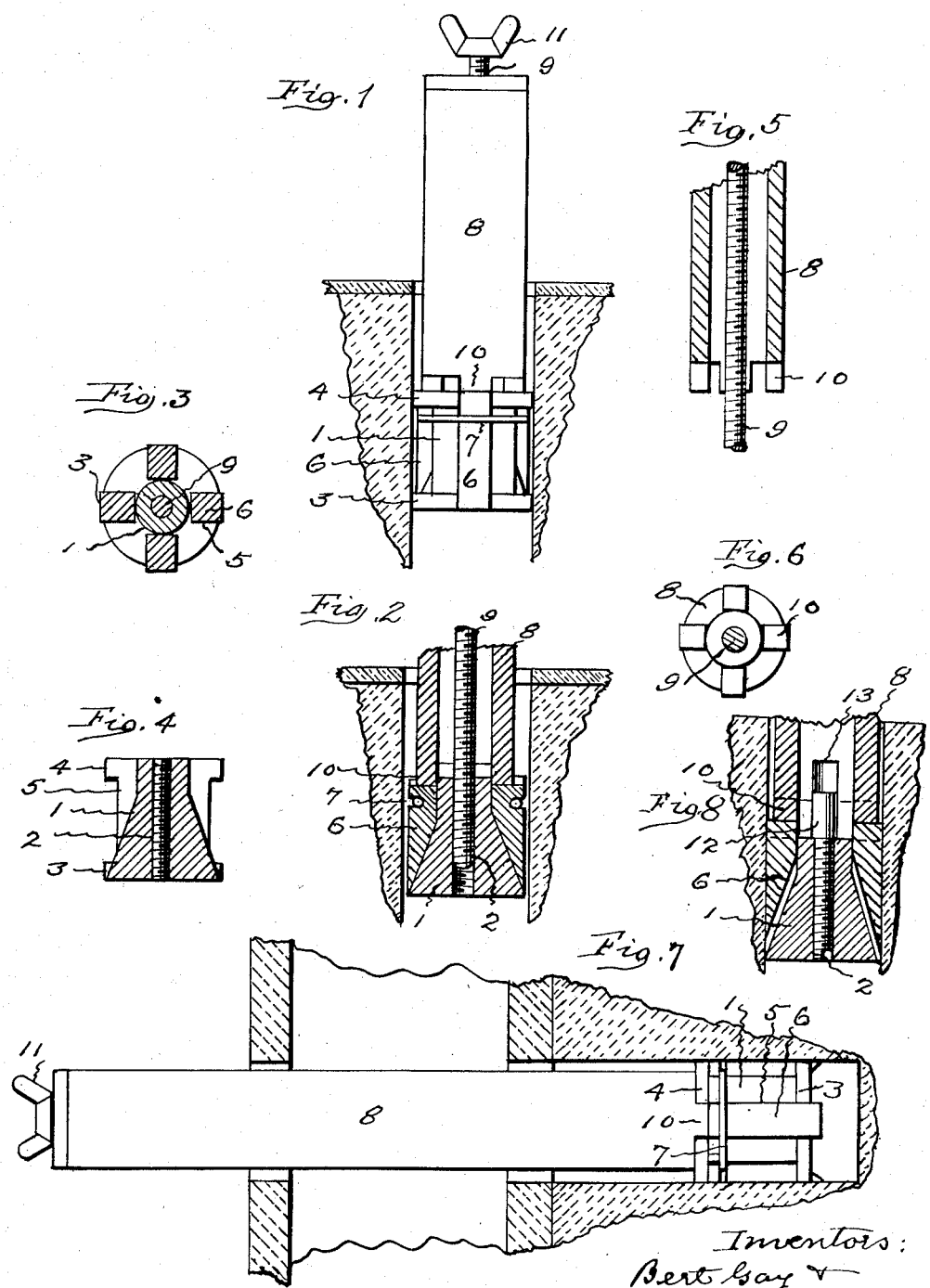

2,377,077

UNITED STATES PATENT OFFICE 2,377,077

EXPANSION NUT

Bert Gay, Hartford, and Roberts K. Skinner, West Hartford, Conn.

Application July 24, 1943, Serial No. 496,008

1 Claim. (Cl. 85—2.4)

This invention relates to the construction of expansion nuts and means for locating and locking the nuts in position in drilled or bored holes in the surfaces of stone, brick, hollow-tile, concrete, and wood and thus provide means for the safe attachment of signs, conduit supports, machinery and similar relatively heavy structures to such surfaces.

The object of the invention is to provide a simple, inexpensive and compact nut of the expansible wing type, all parts of which are made of hard and durable metal, for the purpose mentioned, which can be readily located, retained and locked securely in holes at such depths that it will not pull out under the strains of use, and that the material about the mouths of the holes or the facings of the surfaces, for instance plaster or glazed tile, will not be injured or broken out when strain is put on the nut, and yet the nut can be, if desired, easily salvaged for subsequent use.

In the accompanying drawing, Fig. 1 shows an elevation of a nut located in and about to be locked in a hole. Fig. 2 is a longitudinal section of the lower portion of the structure shown by Fig. 1. Fig. 3 is a transverse section of the body of the nut with the expansible wings in place. Fig. 4 is a central longitudinal section of the body of the nut with the expansible wings omitted. Fig. 5 is a longitudinal section of the lower end of a removable extension which is employed to locate, retain and lock the nut in a hole. Fig. 6 is a view of the bottom end of said extension. Fig. 7 is a view showing the possibility of locking the nut in a hole in a wall back of a hollow tile. Fig. 8 shows a section of a modification of the connection between the extension and the nut.

The structure illustrated as embodying the invention comprises a substantially cylindrical body 1 having an axially threaded bore 2 and exterior flanges 3, 4, at the ends. In the surface of the body and extending longitudinally from end to end are grooves 5, preferably four, the bottom walls of which at the rearward end of the body incline radially outward, and at the forward end of the body extend full depth through the flange 4.

Wings 6 are loosely fitted in these grooves so as to be capable of longitudinal and radial movements, and they are yieldingly retained therein by an encircling coil of spring wire 7 seated in notches in the wings adjacent to the flange 4. The rearward ends of the wings are bevelled underneath and engage with the outwardly inclined ends of the grooves at the rearward end of the body so that when the wings are forced rearward along the body they will be wedged outward. The forward ends of the wings extend into the grooves in the flange 4 at the forward end of the body.

A removable extension 8, preferably tubular, is provided for locking the nut in the hole in which it is to be set. This member is detachably connected with the body of the nut by a threaded spindle 9 that passes through the member into the threaded bore of the nut body, also by tongues 10 at the inner end of the member which are designed to loosely enter the wing grooves in the body flange 4 and engage the ends of the wings 6, and at the same time retain the nut from turning when the spindle is being screwed into and out of the nut. The outer end of the spindle has a thumb nut 11 by which it may be turned. The tongue and groove connection for preventing the nut from turning in the hole as the spindle is turned may be modified by providing a projection 12 on the end of the nut and forming a groove 13 in the end of the extension for receiving the projection, as illustrated in Fig. 8.

In assembling the described structure for use the spindle is engaged with the bore of the nut and the extension tongues entered into the wing grooves in the nut, and with the wings collapsed, the extension is grasped and the nut is thrust into the hole to the position it is to occupy. When the nut is located the spindle is screwed further into the nut. This tends to draw the nut body outward, but as the wings are engaged and held from outward movement by the tongues of the extension the wings are wedged outward by the nut into firm engagement with the wall of the hole.

The extension may be any desired length, of course, however, being sufficiently long to enable it, with the nut located in the desired position, to be grasped and held with the extension tongues in the nut grooves so they will prevent the nut from turning, and with the tongues in contact with the ends of the wings so they will be wedged out when the spindle is screwed in. The spindle is then turned to release it from the nut and the extension withdrawn from the hole, leaving the nut ready to receive the bolt or screw which is to secure the product that is to be supported.

The extension permits the nut to be located, retained and locked at the most desirable and efficient depth from the face of the wall, ceiling or floor on which the product is to be mounted. To salvage a nut after use it is only necessary to disengage the extension from the nut and tap the spindle slightly inward and cause the nut to move laterally inward sufficiently to release the wings from the wedges so that the wings will be collapsed by the spring from the wall of the hole and thus allow the nut to be drawn out. The structure is simple and rugged. It can be cheaply produced entirely of hard metal so as to support heavy loads without danger of loosening or breakage. As the extension tongues back up the wings and prevent the nut from rotating when the spindle is screwed in, the nut can be tightly locked in the exact location even should the hole be drilled or bored oversize. The structure also allows a nut to be set in a hole in a brick backing for hollow tile, as illustrated in Fig. 7.

The invention claimed is:

A structure comprising an expansion nut and means for locating and locking the nut in a hole, said structure embodying a substantially cylindrical nut body having an exterior flange at each end, a central threaded bore and longitudinal grooves in its surface and extending through said flanges, the bottom of said grooves being inclined radially outward near one end and extending full depth at the other end of the nut body, tapered wings loosely fitted in and capable of longitudinal and radial movements in and engaging the taper of said grooves, a coil of spring wire encircling said wings and the reduced section of the nut body adjacent to its outer flange and yieldingly holding the wings in said grooves, a detachable tubular extension with integral tongues at one end adapted to enter said nut grooves and engage the ends of said wings to move them and the encircling spring, said extension being of such length that it can be grasped by hand outside of the hole for locating the nut in or removing it from said hole and for holding the nut from turning, and a threaded spindle, extending longitudinally through and rotatably retained by said extension and threaded into and out of the bore of the nut body, whereby when the spindle is screwed into the nut body the extension tongues enter the wing grooves coupling the extension and the nut and forcing the wings inward so that they will be wedged radially outward, and when the spindle is screwed out of the nut body the extension may be withdrawn from the nut body.

BERT GAY.
ROBERTS K. SKINNER.